(12) United States Patent
Ito et al.

(10) Patent No.: US 11,811,985 B2
(45) Date of Patent: Nov. 7, 2023

(54) INFORMATION PROCESSING APPARATUS, INFORMATION PROCESSING METHOD, AND INFORMATION PROCESSING SYSTEM

(71) Applicant: KABUSHIKI KAISHA TOSHIBA, Tokyo (JP)

(72) Inventors: Masahiro Ito, Ota (JP); Yasutoyo Takeyama, Kawasaki (JP); Tomohiro Yamasaki, Bunkyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 604 days.

(21) Appl. No.: 17/011,725

(22) Filed: Sep. 3, 2020

(65) Prior Publication Data

US 2021/0127022 A1  Apr. 29, 2021

(30) Foreign Application Priority Data

Oct. 29, 2019  (JP) ................... 2019-195806

(51) Int. Cl.
| | |
|---|---|
| G06F 40/106 | (2020.01) |
| H04N 1/00 | (2006.01) |
| G06F 3/0482 | (2013.01) |
| G09G 5/14 | (2006.01) |
| G06F 3/04845 | (2022.01) |
| G06F 3/04883 | (2022.01) |
| G06F 40/103 | (2020.01) |

(52) U.S. Cl.
CPC ....... *H04N 1/00411* (2013.01); *G06F 3/0482* (2013.01); *G06F 3/04845* (2013.01); *G06F 3/04883* (2013.01); *G06F 40/103* (2020.01); *G06F 40/106* (2020.01); *G09G 5/14* (2013.01); *G09G 2340/14* (2013.01)

(58) Field of Classification Search
CPC ............... H04N 1/00411; G06F 3/0482; G06F 3/04845; G06F 3/04883; G06F 40/103; G06F 40/106; G09G 5/14; G09G 2340/14
See application file for complete search history.

(56) References Cited

U.S. PATENT DOCUMENTS

| | | | |
|---|---|---|---|
| 7,882,450 B2 * | 2/2011 | Bornstein | G06F 40/253 |
| | | | 715/802 |
| 10,628,474 B2 * | 4/2020 | Modani | G06F 40/30 |
| 2002/0107844 A1 * | 8/2002 | Cha | G06F 16/3344 |
| 2006/0053172 A1 * | 3/2006 | Gardner | G06N 5/02 |
| | | | 707/999.203 |

(Continued)

FOREIGN PATENT DOCUMENTS

| | | |
|---|---|---|
| JP | 2001-325200 A | 11/2001 |
| JP | 2005-250916 A | 9/2005 |

OTHER PUBLICATIONS

Richard Eckart De Castilho, et al., "A Web-based Tool for the Integrated Annotation of Semantic and Syntactic Structures", Proceedings of the LT4DH workshop at COLING, 2016, 9 pages.

*Primary Examiner* — Mihir K Rayan
(74) *Attorney, Agent, or Firm* — Oblon, McClelland, Maier & Neustadt, L.L.P.

(57) ABSTRACT

According to an embodiment, an information processing apparatus includes one or more processors. The one or more processors display a relation display screen including text box images each indicating one of a plurality of text ranges included in a document and a relation image indicating a relation between the plurality of text ranges.

11 Claims, 7 Drawing Sheets

(56) References Cited

U.S. PATENT DOCUMENTS

| | | | |
|---|---|---|---|
| 2006/0053382 A1* | 3/2006 | Gardner | G06F 3/0482 |
| | | | 715/764 |
| 2010/0235165 A1* | 9/2010 | Todhunter | G06F 40/35 |
| | | | 704/9 |
| 2015/0112664 A1 | 4/2015 | Srinivasan | |
| 2017/0147556 A1* | 5/2017 | Ajmera | G06F 16/367 |
| 2017/0161255 A1* | 6/2017 | Starostin | G06F 40/30 |

* cited by examiner

INFORMATION PROCESSING APPARATUS, INFORMATION PROCESSING METHOD, AND INFORMATION PROCESSING SYSTEM

CROSS-REFERENCE TO RELATED APPLICATIONS

This application is based upon and claims the benefit of priority from Japanese Patent Application No. 2019-195806, filed on Oct. 29, 2019; the entire contents of which are incorporated herein by reference.

FIELD

Embodiments described herein relate generally to an information processing apparatus, an information processing method, and an information processing system.

BACKGROUND

A tool for annotating a dependency relation between words or phrases included in a document has been proposed.

DETAILED DESCRIPTION

According to an embodiment, an information processing apparatus includes the one or more processors. The one or more processors display a relation display screen including text box images each indicating one of a plurality of text ranges included in a document and a relation image indicating a relation between the plurality of text ranges.

An information processing apparatus, an information processing method, and an information processing system will be described in detail below with reference to the accompanying drawings.

Figure 1:
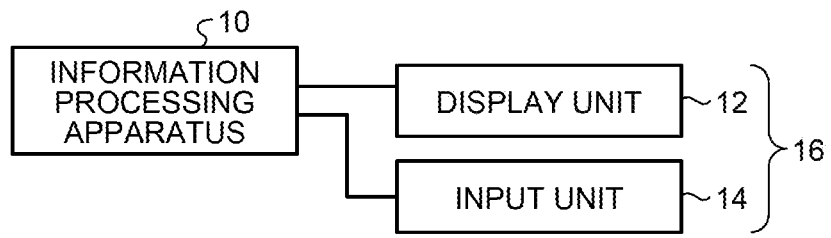
FIG. 1 is a schematic diagram of an information processing system according to an embodiment.

FIG. 1 is a schematic diagram illustrating an example of an information processing system 1 of the present embodiment. The information processing system 1 includes an information processing apparatus 10, a display unit 12, and an input unit 14. The information processing apparatus 10, the display unit 12, and the input unit 14 are communicably connected to each other by wireless or wire.

The information processing apparatus 10 is a dedicated or general-purpose computer. The information processing apparatus 10 displays a unique display screen described below on the display unit 12.

The display unit 12 displays various images. The display unit 12 is, for example, an organic electro-luminescence (EL) display, a liquid crystal display (LCD), and a projection device.

The input unit 14 receives various instructions from the user. The input unit 14 is, for example, a keyboard, a mouse, a touch panel, a microphone, or the like. Note that the display unit 12 and the input unit 14 may be integrated into a user interface (UI) unit 16. In this case, the UI unit 16 may be a touch panel having an input mechanism and an output mechanism. Further, the UI unit 16 may be configured to further include a speaker that outputs sound.

In the present embodiment, a case where the information processing system 1 has a configuration including one display unit 12 will be described as an example. However, the information processing system 1 may be configured to include two or more display units 12. In this case, the information processing apparatus 10 may be configured to display an image on each of the plurality of display units 12.

Figure 2:
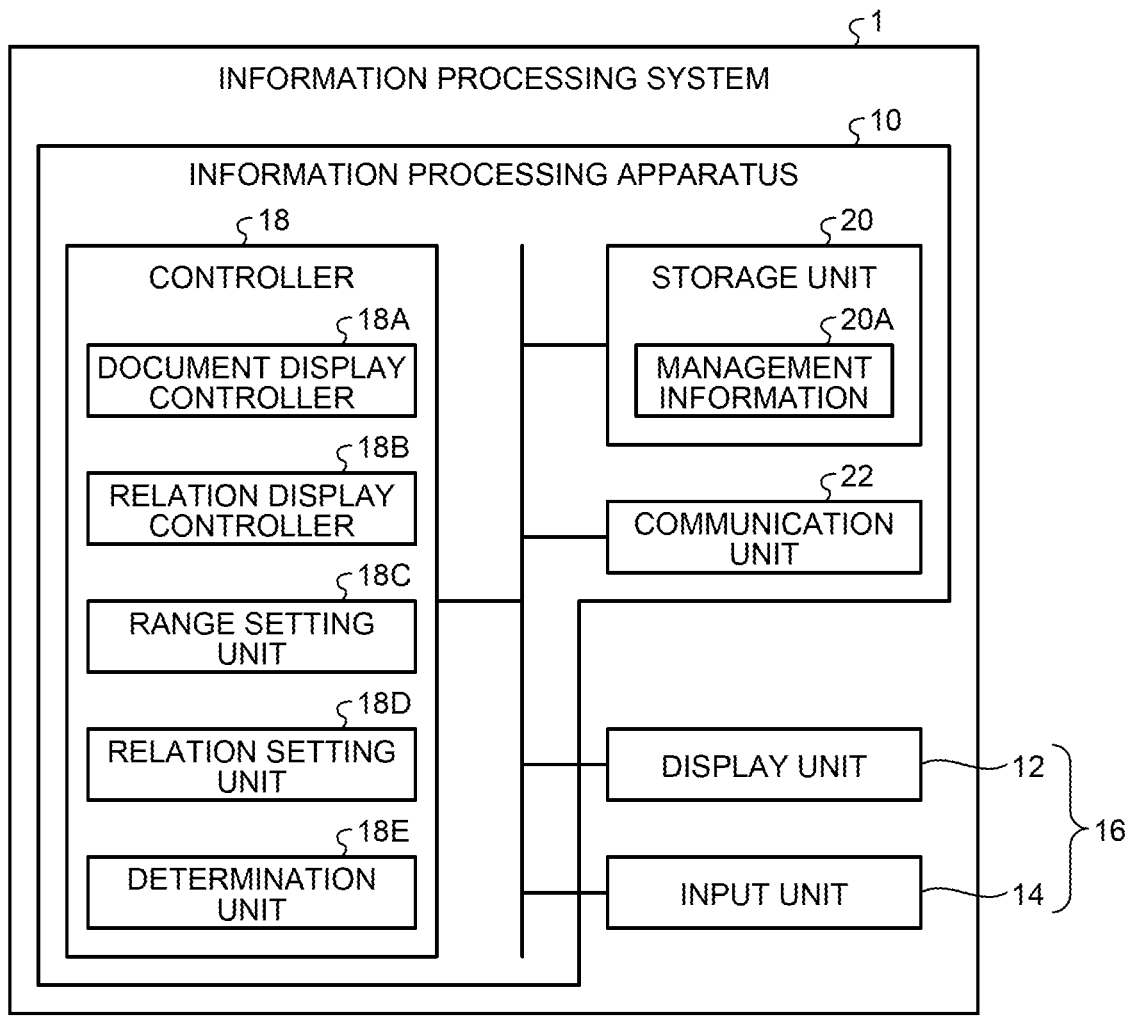
FIG. 2 is a block diagram illustrating a functional configuration of the information processing system according to the embodiment.

FIG. 2 is a block diagram illustrating an example of a functional configuration of the information processing system 1.

The information processing system 1 includes an information processing apparatus 10, a display unit 12, and an input unit 14. The information processing apparatus 10, the display unit 12, and the input unit 14 are connected so that data or signals can be exchanged.

The information processing apparatus 10 includes a controller 18, a storage unit 20, and a communication unit 22. The controller 18, the storage unit 20, and the communication unit 22 are connected so that data or signals can be exchanged.

The information processing apparatus 10 may be configured to include at least one of the display unit 12 and the input unit 14. Further, at least one of the storage unit 20, the display unit 12, and the input unit 14 and the controller 18 may be communicably connected via a network or the like. That is, at least one of the storage unit 20, the display unit 12, and the input unit 14 may be provided in an external device connected to the information processing apparatus 10 via a network. Further, at least one of the functional units described later included in the controller 18 may be provided in the external device. The external device is, for example, an external server.

The storage unit 20 stores various data. The storage unit 20 is, for example, a random access memory (RAM), a semiconductor memory element such as a flash memory, a hard disk, an optical disk, or the like. The storage unit 20 may be a storage device provided outside the information processing apparatus 10. The storage unit 20 may be a storage medium. Specifically, the storage medium may be one in which programs and various types of information are downloaded and stored or temporarily stored via a local area network (LAN), the Internet, or the like. Further, the storage unit 20 may be configured to include a plurality of storage media.

In the present embodiment, the storage unit 20 stores management information 20A. Details of the management information 20A will be described later.

The communication unit 22 is a communication interface for communicating with an external device via a network or the like.

The controller 18 controls to display a display screen on the display unit 12. In the present embodiment, the controller 18 executes control to display two display screens, a text display screen and a relation display screen, on the display unit 12.

Figure 3:
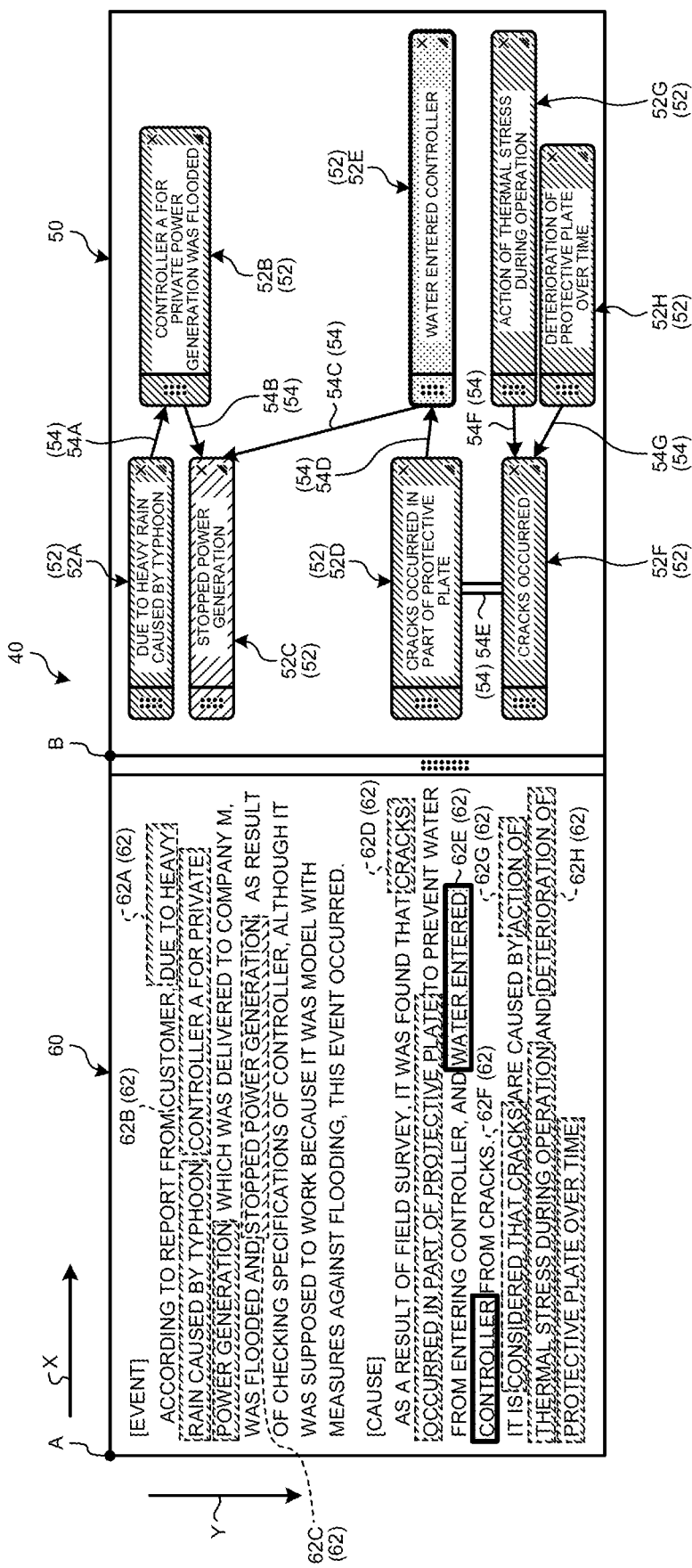
FIG. 3 is a schematic diagram of a display screen of the embodiment.

FIG. 3 is a schematic diagram illustrating an example of a display screen 40 displayed by the controller 18. The display screen 40 includes a text display screen 60 and a relation display screen 50. The controller 18 may display the text display screen 60 and the relation display screen 50 on different display units 12. In the present embodiment, a form in which the display screen 40 including the text display screen 60 and the relation display screen 50 is displayed on one display unit 12 will be described as an example.

The text display screen 60 is a display screen for displaying a document 30. The document 30 is data including text including a plurality of characters. That is, the document 30 includes text including the plurality of characters.

The document 30 includes one or more text ranges 62. The text range 62 is a specific range of text including a list of characters. The text range 62 is set by the process of the controller 18 described later.

The relation display screen 50 is a display screen for displaying a text box image 52 and a relation image 54.

The text box image 52 is an image showing each of the plurality of text ranges 62 included in the document 30. The text box image 52 is, for example, a box-shaped image represented by text included in the text range 62 and a frame line surrounding the text. Further, the text box image 52 may be, for example, an image that schematically shows the text included in the text range 62, an image that shows the text included in the text range 62 in a tabular format, or the like.

Note that one text box image 52 is an image that collectively shows one text range 62. Therefore, when the document 30 includes a plurality of text ranges 62, the relation display screen 50 includes a plurality of text box images 52 corresponding to each of the plurality of text ranges 62. Note that one text box image 52 may be an image that collectively shows the plurality of text ranges 62.

The relation image 54 is an image showing the relation between the plurality of text ranges 62. The relation between the text ranges 62 is a causal relation, an identical relation, a correlate relation, an inclusion relation, a time relation, and the like between the plurality of text ranges 62.

The causal relation means that there is a cause-effect relation among the plurality of text ranges 62. The identical relation means that there is an equivalent relation between the plurality of text ranges 62. The correlate relation means that, of the two text ranges 62, if one changes, the other also changes. The inclusion relation means that one text range 62 includes the other text range 62. The time relation means that one text range 62 is an event that is positioned before or after the other text range 62 in time. Note that the types of relations between the text ranges 62 are not limited to these.

In FIG. 3, a case where the relation image 54 is a line image connecting the plurality of text box images 52 is illustrated as an example. The line image is a linear image in which one end in an extending direction is disposed in contact with one text box image 25, and the other end in the extending direction is disposed in contact with another one text box image 52. Specifically, the line image is a straight line image, an arrow image in which at least one of one end (start point) and the other end (end point) in the extending direction has an arrow shape, and the like. The relation image 54 is not limited to a line image as long as it is an image showing the relation of the text ranges 62 corresponding to the plurality of text box images 52. For example, the relation image 54 may be an animation image or the like showing a plurality of related text box images 52.

In the present embodiment, the controller 18 uses the management information 20A to control the display of the text display screen 60 and the relation display screen 50 on the display unit 12.

Figure 4:
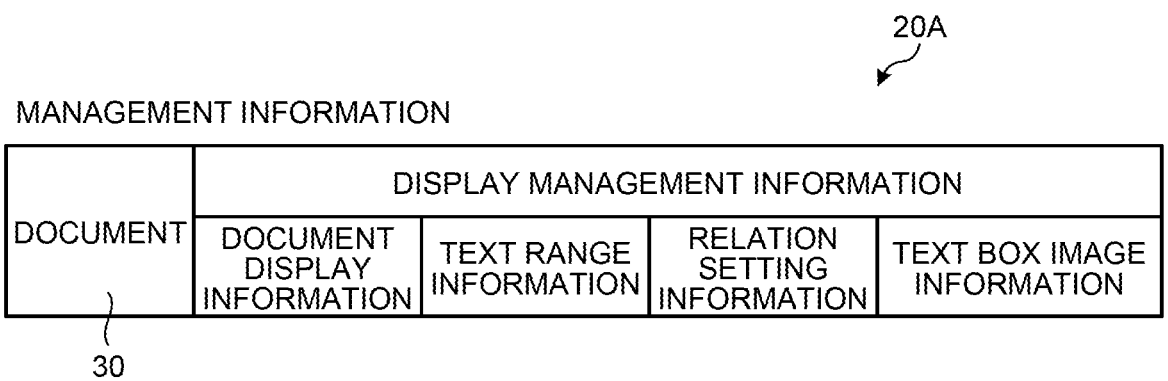
FIG. 4 is a schematic diagram illustrating a data configuration of management information according to the embodiment.

FIG. 4 is a schematic diagram illustrating an example of a data configuration of the management information 20A.

The management information 20A is information for managing information regarding the document 30 displayed on the display unit 12. Various data is registered or updated in the management information 20A by the process of the controller 18. Further, the controller 18 displays the text display screen 60 and the relation display screen 50 on the display unit 12 using the information registered in the management information 20A.

The management information 20A is a database in which the document 30 and the display management information are associated with each other. That is, the management information 20A is a database in which display management information is registered for each document 30. The data format of the management information 20A is not limited to the database. One or more documents 30 may be registered in the management information 20A.

The display management information is information used when the controller 18 displays the display screen 40 on the display unit 12. The display management information includes document display information, text range information, relation setting information, and text box image information.

The document display information is information relating to the display of the document 30. The document display information includes, for example, line spacing, a font size, an enlargement ratio, and the like.

The line spacing is information indicating a space between lines of text when the document 30 is displayed. This will be described with reference to FIG. 3. The line means a direction in which the text is arranged along the writing direction of the text (refer to a direction denoted by an arrow X in FIG. 3). The writing direction means a direction in which characters are written or a direction in which characters are read. In the present embodiment, the case where the writing direction of the text is the direction denoted by the arrow X will be described as an example. In the following description, the writing direction of the text will be referred to as a first direction X. Further, a direction orthogonal to the first direction X will be described as a second direction Y.

The font size is a display size of characters included in the document 30. The enlargement ratio is information indicating an enlargement ratio with respect to reference display magnification when displaying the document 30.

Returning to FIG. 4, the explanation will be continued. Next, the text range information will be described.

The text range information is information relating to the text range 62 included in the document 30. In the present embodiment, the text range information includes information such as a text position, a text display position, and a display form of the text range 62.

The text position is information indicating a position of the text range 62 in the document 30. The text position is represented by information such as a range from the Nth character of the document 30 to the number of M characters. N and M are integers of 1 or more.

The text display position is information indicating a display position of the text range 62 on the text display screen 60 including the document 30. This will be described with reference to FIG. 3. For example, the text display position is represented by position coordinates indicating the display position of the text range 62 in a two-dimensional coordinate space having an origin at a specific position on the text display screen 60 (for example, position A). The two-dimensional coordinate space is, for example, coordinates on a two-dimensional plane along the display surface of the display unit 12. A position A is, for example, a position of an intersection of upstream end portions in the first direction X and the second direction Y on the text display screen 60.

The display form of the text range 62 is information indicating a display form of the text range 62 on the text display screen 60. The display form of the text range 62 is, for example, highlighted display. The highlighted display means display in an emphasized manner compared to other areas. The highlighted display is, for example, a color that prompts the user to gaze (for example, red, yellow, and the like), bold, enlarged display, frame display, animation display, or the like. The animation display means that a moving image such as a character image that prompts a gaze is displayed in the text range 62.

Returning to FIG. 4, the explanation will be continued. Next, the relation setting information will be described.

The relation setting information is information indicating the relation between the plurality of text ranges 62. The relation setting information includes relation information and relation strength information. The relation setting information may further include relation type information. In the present embodiment, the relation setting information will be described as an example of a form including relation information, relation strength information, and relation type information.

The relation information is information indicating that a plurality of text ranges 62 are related. In other words, the relation information is information indicating which text range 62 relates to the text range 62. For example, the relation information is represented by identification information of the text range 62 and information indicating that the text range 62 identified by each of a plurality of pieces of identification information is related.

The relation strength information is information indicating at least one of the strength of the relation and the certainty of the relation between the plurality of text ranges 62.

The relation type information is information indicating the relation type. As described above, the relation type information is, for example, a causal relation, an identical relation, a correlate relation, an inclusion relation, a time relation, or the like.

Next, the text box image information will be described.

The text box image information is information relating to the text box image 52. In the present embodiment, the text box image information includes information such as a display position of the text box image 52 and a display form of the text box image 52 on the relation display screen 50.

The display position of the text box image 52 is information indicating the display position of the text box image 52 on the relation display screen 50. This will be described with reference to FIG. 3. For example, the display position of the text box image 52 is represented by position coordinates indicating the display position of the text box image 52 in a two-dimensional coordinate space having an origin at a specific position on the relation display screen 50 (for example, position B). The position B may be a position corresponding to the position A. Specifically, the position B is a position of the intersection of upstream end portions in the first direction X and the second direction Y on the relation display screen 50.

The display form of the text box image 52 is information indicating the display form of the text box image 52 on the relation display screen 50. The display form of the text box image 52 is, for example, highlighted display. The definition of highlighted display is the same as above.

Returning to FIG. 4, the explanation will be continued. Each information included in the management information 20A having such a data configuration is registered and updated by the process of the controller 18. In addition, the controller 18 uses the management information 20A to control the display of the text display screen 60 and the relation display screen 50 on the display unit 12.

Returning to FIG. 2, the explanation will be continued. Next, the controller 18 will be described in detail.

The controller 18 includes a document display controller 18A, a relation display controller 18B, a range setting unit 18C, a relation setting unit 18D, and a determination unit 18E. At least one of the document display controller 18A, the relation display controller 18B, the range setting unit 18C, the relation setting unit 18D, and the determination unit 18E is realized by, for example, one or more processors. For example, each of the above units may be realized by causing a processor such as a central processing unit (CPU) to execute a program, that is, by software. Each of the above units may be realized by a processor such as a dedicated integrated circuit (IC), that is, hardware. Each of the above units may be realized by using software and hardware in combination. When using a plurality of processors, each processor may realize one of the units or two or more of the units.

The document display controller 18A controls to display the text display screen 60 on the display unit 12. The document display controller 18A reads the document 30 to be display-controlled from the management information 20A and displays a text display screen 60 including the document 30 on the display unit 12. The document 30 to be display-controlled is, for example, the document 30 input by a user's operation instruction of the input unit 14. The document display controller 18A may specify the document 30 identified by the document identification information received from the input unit 14 as a display control target and read it from the management information 20A.

At this time, the document display controller 18A reads the document display information and the text range corresponding to the document 30 specified as the display control target from the management information 20A. Then, the document display controller 18A displays the text range 62 included in the document 30 and specified by the text position included in the text range information in a display form indicated by the display form of the text range 62 included in the text range information.

Therefore, as illustrated in FIG. 3, in the text display screen 60, each of the plurality of text ranges 62 (for example, a text range 62A to a text range 62H) included in the document 30 is highlighted and displayed in a display form different from the text area other than the text range 62. That is, the document display controller 18A displays on the display unit 12 the text display screen 60 indicated in a display form in which the text range 62 is highlighted.

The management information 20A is updated by the range setting unit 180, the relation setting unit 18D, and the determination unit 18E (details will be described later). Therefore, the document display controller 18A may execute the above display process when displaying a new document 30, and when the management information 20A is updated by the range setting unit 180, the relation setting unit 18D, or the determination unit 18E.

Returning to FIG. 2, the explanation will be continued. The relation display controller 18B performs display control to display the relation display screen 50 including the text box image 52 and the relation image 54 on the display unit 12.

The relation display controller 18B reads the relation setting information and the text box image information corresponding to the document 30 to be display-controlled from the management information 20A.

The relation display controller 18B may specify the document 30 specified as the display control target by the document display controller 18A as the document 30 to be display-controlled. That is, the relation display controller 18B may read the relation setting information and the text box image information corresponding to the document 30 in which the display is controlled on the text display screen 60 by the document display controller 18A from the management information 20A.

Then, the relation display controller 18B displays the text box image 52 specified by each of the read plurality of pieces of text box image information on the relation display screen 50. Specifically, the relation display controller 18B, at the display position of the text box image 52 included in the text box image information, displays the text of the text range 62 indicated by the corresponding text range information in the display form indicated by the display form of the text box image 52.

Further, the relation display controller 18B reads the relation setting information corresponding to the text box image information, and the relation image 54 is displayed between the plurality of text box images 52 corresponding to each of the plurality of text ranges 62 indicated by the relation information. Specifically, the relation display controller 18B displays the relation image 54, which is a line image connecting the plurality of text box images 52 to each other, on the text display screen 60.

Therefore, as illustrated in FIG. 3, on the relation display screen 50, the plurality of text box images 52 corresponding to each of the plurality of text ranges 62 included in the document 30 and the relation image 54 connecting the plurality of text box images 52 to each other are displayed.

The relation display controller 18B preferably displays the relation image 54 in the display form according to information on the relation strength and the relation type information included in the relation setting information.

For example, it is assumed that the relation type information indicates a causal relation, an inclusion relation, or a time relation. In this case, the relation display controller 18B displays an arrow image with a start point at the text box image 52 on the upstream side of these relations and an end point at the text box image 52 on the downstream side of the relation from the start point, as the relation image 54 (refer to relation image 54A to relation image 54D, relation image 54F to relation image 54G). The upstream side of the relation means the text box image 52 of the text range 62 that causes the problem in the case of causal relation. The upstream side of the relation means the text box image 52 of the text range 62 on the side including the other text range 62 in the case of the inclusion relation. The upstream side of the relation means the text box image 52 of the text range 62, which is the event that is located earlier in time in the case of the time relation.

In addition, for example, the relation display controller 18B assumes a case where the relation type information is an identical relation or a correlate relation. In this case, the relation display controller 18B displays a straight line image connecting the plurality of text box images 52 having these relation as the relation image 54 (refer to the relation image 54E).

Then, at this time, the relation display controller 18B displays the relation image 54 in a form according to the relation strength included in the relation setting information. For example, the relation display controller 18B displays the relation image 54 represented by a thicker line as the relation strength information is information indicating a stronger relation or stronger certainty.

Note that the relation display controller 18B preferably displays the relation display screen 50 upstream or downstream of the text display screen 60 displayed on the display unit 12 in the first direction X that is the writing direction of the text of the document 30 included in the text display screen 60. Specifically, for example, as illustrated in FIG. 3, the relation display controller 18B preferably arranges the relation display screen 50 on the downstream side of the text display screen 60 in the first direction X. By arranging the text display screen 60 and the relation display screen 50 in this way, it is possible to further improve the visibility of the relation between the text ranges 62 included in the document 30.

The management information 20A is updated by the range setting unit 18C, the relation setting unit 18D, and the determination unit 18E (details will be described later). Therefore, the relation display controller 18B may execute the above display process when displaying a new document 30, and when the management information 20A is updated by the range setting unit 18C, the relation setting unit 18D, or the determination unit 18E.

The display position of the text box image 52 displayed on the relation display screen 50 may be changed by a user's operation instruction of the input unit 14 or the like. In this case, the relation display controller 18B may update the display position of the text box image 52 included in the text box image information of the text box image 52 to the changed display position.

Further, with respect to the text box image 52 displayed on the relation display screen 50, a deletion instruction may be input by a user's operation instruction of the input unit 14, or the like. In this case, the relation display controller 18B may delete the text box image information of the text box image 52 and the text range information of the corresponding text range 62 from the management information 20A.

In addition, a specific text box image 52 included in the relation display screen 50 may be selected by a user's operation instruction of the input unit 14. In this case, the document display controller 18A and the relation display controller 18B preferably change the display form of the selected text box image 52 and the text range 62 corresponding to the text box image 52 to a display form indicating that these are information indicating the same text. For example, the document display controller 18A and the relation display controller 18B preferably simultaneously highlight the selected text box image 52 and the corresponding text range 62, display a line image connecting the controllers, and display the animation of the images moving between the controllers. Similarly, a specific text range 62 included in the text display screen 60 may be selected by a user's operation instruction of the input unit 14. In this case, the document display controller 18A and the relation display controller 18B preferably chance the display form of the selected text range 62 and the text box image 52 corresponding to the selected text range 62 to a display form indicating that these are information indicating the same text. For example, the document display controller 18A and the relation display controller 18B preferably simultaneously highlight the selected text range 62 and the corresponding text box image 52, display a line image connecting the controllers, and display the animation of the images moving between the controllers.

FIG. 3 illustrates, as an example, a case where a text box image 52E on the relation display screen 50 is selected. In this case, the document display controller 18A and the relation display controller 18B highlight the text box image 52E and a text range 62E corresponding to the text box image 52E. Further, in the same way, the document display controller 18A and the relation display controller 18B may highlight a text box image 52C and a text range 62C that have relation with the selected text box image 52E and that are located adjacently downstream in the relation direction.

Returning to FIG. 2, the explanation will be continued. Next, the range setting unit 18C, the relation setting unit 18D, and the determination unit 18E will be described. The range setting unit 18C, the relation setting unit 18D, and the determination unit 18E are functional units that register and update (change) the display management information in the management information 20A.

First, the range setting unit 18C will be described. The range setting unit 18C sets the text range 62 included in the document 30. Setting the text range 62 means specifying the text range 62 included in the document 30 and registering the text range information of the text range 62 in the management information 20A.

The range setting unit 18C sets the text range 62 included in the document 30 by designation by an operation instruction of the input unit 14 by the user, text analysis, or the like.

For example, the user selects the desired text range 62 by operating the input unit 14 while visually checking the document 30 displayed on the text display screen 60. The input unit 14 outputs the text position and the text display position of the selected text range 62 to the document display controller 18A.

The document display controller 18A registers the text position and the text display position received from the input unit 14 in the management information 20A as the text range information corresponding to the document 30. The document display controller 18A registers the text range information in the management information 20A for each text range 62.

When registering the new text range information in the management information 20A, the range setting unit 18C may register information indicating a predetermined display form (for example, highlight displaying the text box image 52 in a specific color) as the display form of the text range 62 in the management information 20A.

The display area of the document 30 displayed on the text display screen 60 may be scrolled by a user's operation instruction of the input unit 14 or the like. In this case, each display position of the text range 62 included in the text display screen 60 is changed. Therefore, every time the display position of the text range 62 on the text display screen 60 is changed, the range setting unit 18C may update the text display position included in the text range information of the text range 62 to the current display position.

The range setting unit 18C also registers an initial value in the management information 20A as text box image information corresponding to the text range information registered in the management information 20A. The initial values of the text box image information are initial values of the display position of the text box image 52 and the display form of the text box image 52 on the relation display screen 50. The initial values may be set in advance. For example, the initial value is a display position obtained by coordinate-converting the display position of the text range 62 on the text display screen 60 into two-dimensional coordinates with the position B on the relation display screen 50 as the origin.

Note that the range setting unit 18C may set the analysis result of the text range 62 by text analysis instead of or together with the designation by the user's operation instruction of the input unit 14.

For example, the range setting unit 18C specifies the plurality of text ranges 62 included in the document 30 by text-analyzing the document 30. A known method or a learning model may be used for the text analysis. Then, the range setting unit 18C may register the text position and the text display position of the specified text range 62 in the management information 20A as the text range information corresponding to the document 30.

Next, the relation setting unit 18D will be described. The relation setting unit 18D sets the relation setting information. Setting the relation setting information means specifying the relation between the plurality of text ranges 62 and registering the relation setting information, which is information indicating the relation, in the management information 20A. That is, the relation setting unit 18D sets the relation setting information including the relation information indicating that the plurality of text ranges 62 are related and the relation strength information indicating the strength of the relation.

The relation setting unit 18D sets the relation setting information by designation by an operation instruction of the input unit 14 by the user, text analysis, or the like.

For example, the user operates the input unit 14 while visually recognizing the plurality of text box images 52 displayed on the relation display screen 50, thereby inputting the line image connecting the desired plurality of text box images 52. Specifically, for example, a directional relation such as a causal relation is assumed. In this case, the user operates the input unit 14 to perform an operation such as dragging a mouse from the text box image 52 as a start point to the text box image 52 as an end point. By this input operation, the user inputs the relation between the two text box images 52 with directions.

By this input operation, the input unit 14 receives the relation information that is the information indicating which of the text box images 52 the text range 62 is related to, and outputs the relation information to the controller 18. The relation setting unit 18D receives the relation information from the input unit 14. Then, the relation setting unit 18D registers the received relation information in the management information 20A as relation setting information corresponding to the text range information of the text range 62.

At this time, for example, it is assumed that a specific area on the display screen 40 is instructed by an operation instruction of the input unit 14 by the user. In this case, the relation setting unit 18D displays a selection screen for selecting at least one of the relation type information and the relation strength information on the relation display screen 50. The user operates the input unit 14 while visually checking the selection screen to select desired relation type information and desired relation strength information. The relation setting unit 18D receives the relation type information and the relation strength information from the input unit 14. Then, the relation setting unit 18D registers the relation setting information that further includes the received relation type information and relation strength information in the management information 20A. The user can also input an instruction to change the relation type information or delete the relation by operating the input unit 14.

Note that the relation setting unit 18D may set the analysis result by text analysis or the like as the relation setting information instead of or together with the designation by the user's operation instruction of the input unit 14.

For example, the relation setting unit 18D analyzes the text of the document 30 to derive the relation setting information including relation information indicating that the plurality of text ranges 62 are related and the relation strength information indicating the strength of the relation, for the plurality of text ranges 62 included in the document 30. A known method or a learning model may be used for the text analysis. Then, the relation setting unit 18D may register the derived relation setting information in the management information 20A.

Next, the determination unit 18E will be described. The determination unit 18E determines the display position on the relation display screen 50 of each of the plurality of text box images 52 included in the relation display screen 50. The determination unit 18E also determines the document display information of the document 30 on the text display screen 60.

First, the determination of the document display information by the determination unit 18E will be described. The determination unit 18E determines document display information such as the line spacing, the font size, the enlargement ratio, and the like at the time of display for the document 30 displayed on the text display screen 60. The determination unit 18E determines these pieces of information and updates the management information 20A.

For example, the determination unit 18E determines the document display information according to the display density of the plurality of text ranges 62 included in the text display screen 60, the display density of the plurality of text box images 52 included in the relation display screen 50, and the like. For example, the determination unit 18E determines the document display information such that the display density of the plurality of text box images 52 included in the relation display screen 50 is less than the threshold value of the density that impairs the visibility by the user.

Further, for example, the determination unit 18E may determine the document display information such as the line spacing, the font size, the enlargement ratio, and the like at the time of display so that the predetermined number of the plurality of text ranges 62 are included in the single text display screen 60. Further, the determination unit 18E may determine the document display information such as the line spacing, the font size, the enlargement ratio, and the like at the time of display so that the text range 62 corresponding to all the text box images 52 displayed on the relation display screen 50 is included in the single text display screen 60. Further, the determination unit 18E may determine the document display information so that the text box image 52 set by the relation setting unit 18D and the text range 62 corresponding to all of the text box images 52 related with the text box image 52 are included in a single screen text display screen 60.

Then, the determination unit 18E registers the determined document display information in the management information 20A. As described above, the document display controller 18A and the relation display controller 18B display the relation display screen 50 and the text display screen 60 based on the management information 20A. Therefore, each time the management information 20A is updated by the determination unit 18E, the relation display screen 50 and the relation display screen 50 according to the updated new information are displayed on the display unit 12.

Next, the determination of the display position of the text box image 52 by the determination unit 18E will be described.

The determination unit 18E reads at least one of the text display position, which is the display position of the text range 62 on the text display screen 60, and the relation setting information of the text box image 52 corresponding to the text range 62 from the management information 20A. Then, the determination unit 18E determines the display position of each of the plurality of text box images 52 on the relation display screen 50 according to at least one of the text display position and the relation setting information.

For example, the determination unit 18E executes a determining process of the display position of the text box image 52 when the range setting unit 18C or the relation setting unit 18D registers new information in the management information 20A, or when at least a part of the management information 20A is updated. For example, the determination unit 18E executes the determining process when the range setting unit 18C sets a new text range 62. Further, the determination unit 18E executes the determining process when the display position of the text box image 52 is moved by a user's operation instruction of the input unit 14 or the like. The determination unit 18E may execute the determining process at every predetermined timing or when a predetermined button or button image is instructed by an operation instruction of the input unit 14 by the user.

Then, the determination unit 18E registers the determined display position of the text box image 52 in the management information 20A as the text box image information. The document display controller 18A and the relation display controller 18B execute the display control each time at least a part of the display management information of the management information 20A is chanced or updated. Therefore, each time the management information 20A is updated by the determination unit 18E, the relation display screen 50 and the relation display screen 50 according to the updated new information are displayed on the display unit 12.

In the present embodiment, the determination unit 18E determines the display position of the text box image 52 so that at least one of the following conditions 1 to 6 is satisfied.

First, Condition 1 will be described. The determining process of the display position that satisfies Condition 1 is the following process. In this case, the determination unit 18E identifies the display position of the text range 62 on the text display screen 60, and determines, in an area within a predetermined range from the corresponding display position on the relation display screen 50, a display position of the text box image 52 indicating the text range 62.

Specifically, the determination unit 18E reads the text range information in the management information 20A for each of the plurality of text ranges 62 included in the text display screen 60. Then, the determination unit 18E reads the text display position included in the text range information. Through these processes, the determination unit 18E identifies the position coordinates indicating the display position on the text display screen 60 for each of the plurality of text ranges 62.

Then, the determination unit 18E coordinate-converts the display position of the text range 62 represented by the position coordinates with a position A on the text display screen 60 as the origin in a coordinate space of the position coordinates with a position B on the relation display screen 50 as the origin. For example, the determination unit 18E identifies the position coordinates of the text ranges 62 on the text display screen 60 as the position coordinates on the relation display screen 50. Then, the determination unit 18E determines the display position of the text box image 52 indicating the text range 62 in an area within a predetermined range from the position of the identified position coordinates. The predetermined range may be set in advance.

Through this process, the determination unit 18E converts the display position of each of the text ranges 62 having the position A on the text display screen 60 as the origin into the display position having the position B on the relation display screen 50 as the origin, and determines the converted display position as the display position of the text box image 52. That is, the determination unit 18E can determine a position on the relation display screen 50 that substantially matches the display position of each of the text ranges 62 of the text display screen 60 as the display position of the text box image 52.

Next, Condition 2 will be described. The determining process of the display position that satisfies Condition 2 is the following process. In this case, the determination unit 18E identifies the display position of the text range 62 on the text display screen 60 in the second direction Y. Then, the determination unit 18E determines, in an area within a predetermined range in the second direction Y from the display position on the relation display screen 50, the display position of the text box image 52 indicating the text range 62.

In this case, the determination unit 18E reads the text range information in the management information 20A for each of the plurality of text ranges 62 included in the text display screen 60. Then, the determination unit 18E reads the text display position included in the text range information. At this time, the determination unit 18E reads the position coordinates in the second direction Y as the text display position.

Then, the determination unit 18E coordinate-converts the display position of the text range 62 represented by the position coordinates with a position A on the text display screen 60 as the origin in a coordinate space of the position coordinates with a position B on the relation display screen 50 as the origin. For example, the determination unit 18E performs coordinate conversion of the position coordinates of each of the text ranges 62 in the second direction Y on the text display screen 60 into the position coordinates in the second direction Y on the relation display screen 50. Then, the determination unit 18E determines the display position of the text box image 52 indicating the text range 62 in an area within a predetermined range from the position of the identified position coordinates. The predetermined range may be set in advance.

In this case, the determination unit 18E can determine a position on the relation display screen 50 that substantially matches the display position of each of the text ranges 62 in the second direction Y of the text display screen 60 as the display position of the text box image 52.

Next, Condition 3 will be described. The determining process of the display position that satisfies Condition 3 is the following process. In this case, the determination unit 18E determines the display position of each of the text box images 52 on the relation display screen 50 so that the arrows of the arrow images that are the relation images 54 on the relation display screen 50 are in the same direction.

Determining the display position of the text box image 52 so that the directions of the arrows are in the same direction means to determine the display position of each of the plurality of text box images 52 so that the directions of the arrows in the arrow image, which is the relation image 54, approach the same direction as much as possible. For this reason, it does not mean that the arrow directions of the arrow images that are all the relation images 54 are completely the same.

Next, Condition 4 will be described. The determining process of the display position that satisfies Condition 4 is the following process. In this case, the determination unit 18E performs a process of determining the display position of the text box images 52 on the relation display screen 50 so that the distance between the plurality of related text box images 52 is shorter than the distance between the plurality of unrelated text box images 52.

Next, Condition 5 will be described. The determining process of the display position that satisfies Condition 5 is the following process. In this case, the determination unit 18E performs a process of suppressing the text box images 52 of a predetermined number or more from being arranged along the first direction X on the relation display screen 50. Specifically, when the display position of the text box image 52 is determined so as to satisfy at least one of the above Conditions 1 to 4, the plurality of text box images 52 may be arranged along the first direction X at the substantially same display position on the relation display screen 50 in the second direction Y. Therefore, the determination unit 18E changes the position of at least one of the plurality of text box images 52 in the second direction Y when the text box images 52 of a predetermined number or more are arranged along the first direction X.

Next, Condition 6 will be described. The determining process of the display position that satisfies Condition 6 is the following process. In this case, the determination unit 18E performs a process of adjusting the display position of each of the text box images 52 so that the distance between the plurality of text box images 52 on the relation display screen 50 does not become a predetermined minimum display distance or shorter. The minimum display distance may be set in advance. For example, the minimum display distance is a value exceeding 0. Specifically, when the display position of the text box image 52 is determined so as to satisfy at least one of the above Conditions 1 to 5, the distance between at least some of the text box images 52 is the minimum display distance or shorter. Therefore, the determination unit 18E may perform the determining process of the display position that satisfies Condition 6.

The determination unit 18S may determine the display position of the text box image 52 using the following Equation (1) so that at least one of the above Conditions 1 to 6 is satisfied.

$$u_{i,t+1} = u_{i,t} + \alpha_0 \begin{pmatrix} 1 & 0 \\ 0 & 0 \end{pmatrix}(s_i - u_{i,t}) + \alpha_1 \sum_k d_1(\|u_{i,t} - u_{k,t}\|)\frac{u_{i,t} - u_{k,t}}{\|u_{i,t} - u_{k,t}\|} + \\ \alpha_2 \sum_{k|\exists e(i,k) \cup \exists e(k,i)} d_2(\|u_{k,t} - u_{i,t}\|)\frac{u_{k,t} - u_{i,t}}{\|u_{k,t} - u_{i,t}\|} + \\ \alpha_3 \left\| \begin{pmatrix} 1 & 0 \\ 0 & 0 \end{pmatrix} u_{i,t} \right\|^2 \begin{pmatrix} -1 & 0 \\ 0 & 0 \end{pmatrix}\frac{u_{i,t}}{\|u_{i,t}\|} + \\ \alpha_4 \sum_{k|\exists e(k,i)} d_3(z \cdot (u_{i,t} - u_{k,t}))z + \frac{\alpha_5}{t}r \quad (1)$$

In Equation (1), $d_1(x)$, $d_2(x)$, and $d_3(x)$ are respectively represented by the following Equations (2) to (4).

$$d_1(x) = \exp(-\beta_1 x^2) \quad (2)$$

$$d_2(x) = \frac{1}{1 + \exp(-(\beta_2 x - \beta_3))} \quad (3)$$

$$d_3(x) = \frac{-1}{1 + \exp(-(\beta_4 x - \beta_5))} + \beta_6 \quad (4)$$

In Equations (1) to (4), u indicates the display position (position coordinate) of the text box image 52 on the relation display screen 50. i indicates the identification information of the text box image 52. t indicates the number of times (iteration number) the calculation of Equation (1) is repeated. That is, "$u_{i,t+1}$" is the display position calculated this time of the text box image 52 identified by "i". "$u_{i,t}$" is the previously calculated display position of the text box image 52 identified by "i".

In Equations (1) to (4), $\alpha$ and $\beta$ are integers. s indicates the display position (position coordinate) of the text range 62 on the text display screen 60.

Further, in Equations (1) to (4), e(a,b) indicates an arrow image, which is the relation image 54, from the text box image 52 identified by the identification information "a" to the text box image 52 identified by the identification information "b".

Further, in Equations (1) to (4), z represents a specific unit vector. r indicates a random unit vector.

In Equations (1) to (4), the portions shown in bold indicate the display positions (position coordinates) of the text range 62 on the text display screen 60 and the display positions (position coordinates) of the text box image 52 on the relation display screen 50, or a two-dimensional vector indicating the direction on the relation display screen 50. The portions shown in bold are specifically "$u_{i,t+1}$", "$u_{i,t}$", "$s_i$", "$u_{k,t}$", "z", and "r" in the above Equation (1).

In addition, in Equation (1), the term of $\alpha_0$ is the terms of Condition 1 and Condition 2. Also, the term of $\alpha_1$ is the term of Condition 6. The term of $\alpha_2$ is the term of Condition 4. The term of $\alpha_3$ is the term of Condition 5. The term of $\alpha_4$ is the term of Condition 3.

The determination unit 18E repeatedly executes a calculating process of calculating the display position "$u_{i,t+1}$" on the relation display screen 50 by using the above Equation (1) for each of all the plurality of text box images 52 included in the relation display screen 50. The number of times this calculating process is repeated corresponds to the number of times of calculation (the number of iterations). Then, the determination unit 18E calculates the movement distance from the previously calculated display position of each of the plurality of text box images 52 every time the calculating process is performed. Further, the determination unit 18E calculates the sum of the movement distance from the previously calculated of each of the plurality of text box images 52 as the total movement amount. Then, the determination unit 18E repeatedly executes the above calculating process until the total movement amount falls below a certain threshold. If the determination unit 18E may determine each display position "$u_{i,t+1}$" of the text box image 52 when this total movement amount is below a certain threshold as the display position of each text box image 52. Then, the determination unit 18E may register the determined display position in the management information 20A as the text box image information of each of the plurality of text box images 52.

The determination unit 18E may assign a weighting value to each of the terms $\alpha_0$, $\alpha_1$, $\alpha_2$, $\alpha_3$, and $\alpha_4$ in the above Equation (1), and adjust the weighting value. By this adjustment, the determination unit 18E may adjust the weighting of each of the above Conditions 1 to 6.

Figure 5:
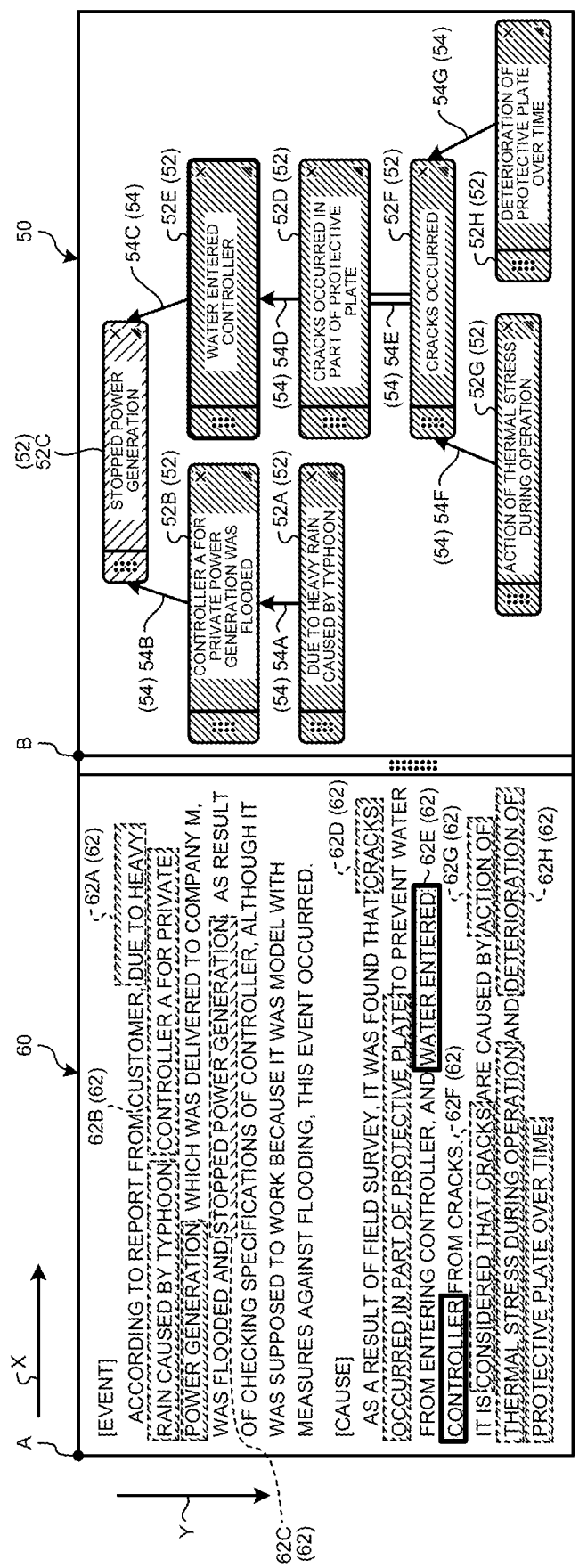
FIG. 5 is a schematic diagram of a display screen of the embodiment.

For example, a case where the weighting value of the term $\alpha_0$, which is the term of Condition 1, is set smaller than the weighting values of the other terms ($\alpha_1$, $\alpha_2$, $\alpha_3$, and $\alpha_4$) is measured. In this case, as illustrated in FIG. 5, the display position of each of the text box images 52 included in the relation display screen 50 is a layout in which the relation between the text box images 52 is emphasized rather than the position according to the display position of the text range 62 on the text display screen 60. That is, the layout is such that the arrow images that are the relation images 54 are adjusted so as to face the same direction. In this case, the information processing apparatus 10 can provide the user with the relation between the plurality of text box images 52 in a more visible manner. Further, the information processing apparatus 10 can improve the visibility when the user gives an operation instruction of the relation setting information.

Note that the weighting values of the terms $\alpha_0$, $\alpha_1$, $\alpha_2$, $\alpha_3$, and $\alpha_4$ may be changed as appropriate according to a user's operation instruction of the input unit 14 or the like.

Next, an example of the flow of information process executed by the information processing apparatus 10 of the present embodiment will be described.

Figure 6:
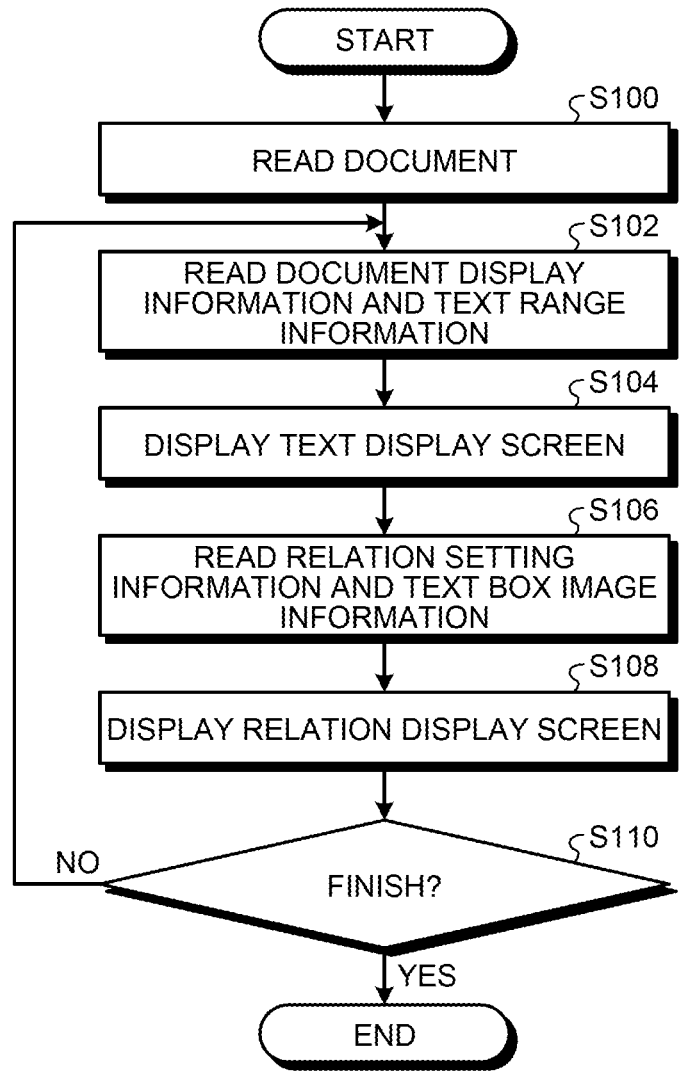
FIG. 6 is a flowchart illustrating a flow of information processing of the embodiment.

FIG. 6 is a flowchart illustrating an example of the flow of information process executed by the information processing apparatus 10.

The document display controller 18A reads the display-controlled document 30 from the management information 20A (step S100). The document display controller 18A reads the document display information and the text range information corresponding to the document 30 read in step S100 from the management information 20A (step S102). Then, the document display controller 18A indicates the document 30 read in step S100 by the document display information read in step S102, and displays the text display screen 60 including the text range 62 of the text range information read in step S102 on the display unit 12 (step S104).

The relation display controller 18B reads the relation setting information and the text box image information corresponding to the document 30 read in step S100 from the management information 20A (step S106).

The relation display controller 18B displays the relation display screen 50 including the text box image 52 specified by each of the read plurality of pieces of text box image information and the relation image 54 represented by the relation setting information on the display unit 12 (step S108).

Through the processes of steps S102 to S108, the display unit 12 displays the relation display screen 50 and the text display screen 60 illustrated in FIG. 3 or FIG. 5. Note that the processes of steps S102 to S108 are not limited to the form of being executed in the order illustrated in FIG. 6. At least a part of the processes in steps S102 to S108 may be executed in parallel at overlapping timings.

Next, the controller 18 determines whether to end the display process of the display screen 40 (step S110). For example, the controller 18 performs determination in step S110 by determining whether or not a signal indicating an end instruction has been received by a user's operation instruction of the input unit 14 or the like. If a negative determination is made in step S110 (step S110: No), the process returns to step S102. On the other hand, if a positive determination is made in step S110 (step S110: Yes), this routine ends.

Next, the interrupt processing executed by the information processing apparatus 10 of the present embodiment during the information process of FIG. 6 will be described. The information processing apparatus 10 of the present embodiment repeatedly executes the interrupt processing illustrated in FIG. 7 during the information process of FIG. 6.

Figure 7:
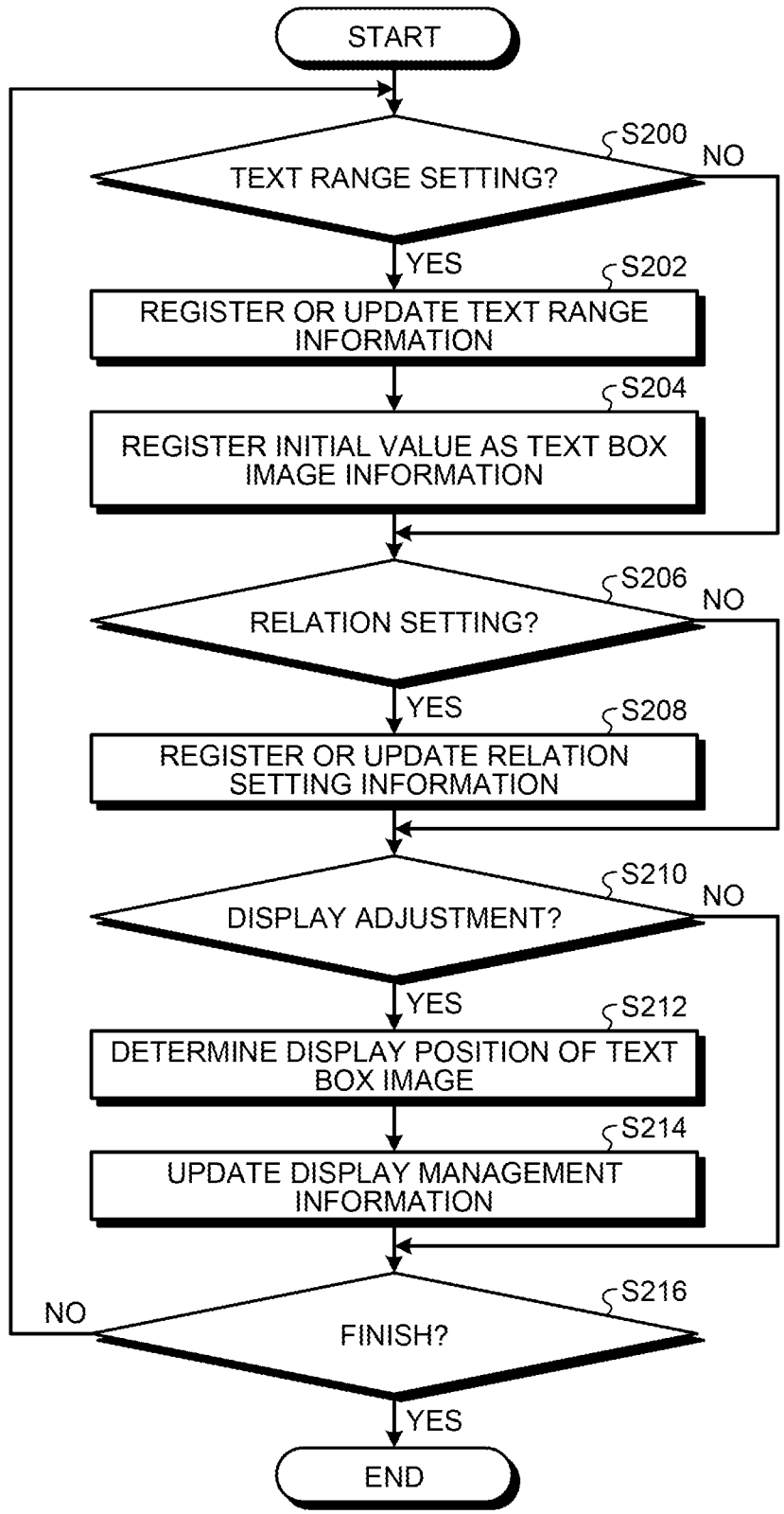
FIG. 7 is a flowchart illustrating a flow of interrupt processing of the embodiment.

FIG. 7 is a flowchart illustrating an example of the flow of interrupt processing executed by the information processing apparatus 10.

The range setting unit 180 determines whether to set the text range 62 (step S200). For example, the range setting unit 180 determines to set the text range 62 for the document 30 displayed on the display unit 12 when the selection of a desired range by the user is received by an operation instruction of the input unit 14 by the user.

If a negative determination is made in step S200 (step S200: No), the process proceeds to step S206 described later. If a positive determination is made in step S200 (step S200: Yes), the process proceeds to step S202 described later. In step S202, the range setting unit 18C registers the text position and the text display position received from the input unit 14 in step S200 in the management information 20A as the text range information for the document 30 (step S202). The text range information of the text range 62 including the same text position in the document 30 may be registered in the management information 20A. In this case, the range setting unit 18C may update the management information 20A so that it becomes the text range information indicating the text position and the text display position received from the input unit 14.

The range setting unit 18C registers an initial value in the management information 20A as text box image information corresponding to the text range information registered or updated in the management information 20A in step S202 (step S204).

Next, the relation setting unit 18D determines whether to set the relation setting information (step S206). For example, the relation setting unit 18D performs determination of step S206 by determining whether or not the relation display screen 50 displayed on the display unit 12 has received the input of the relation setting information according to the operation instruction of the input unit 14 by the user. If a negative decision is made in step S206 (step S206: No), the process proceeds to step S210 described later.

If a positive determination is made in step S206 (step S206: Yes), the process proceeds to step S208 described later. In step S208, the relation setting unit 18D registers the relation setting information received from the input unit 14 in the management information 20A (step S203).

Next, the determination unit 18E determines whether to perform display adjustment of at least one of the text box image 52 and the relation image 54 is (step S210). For example, the determination unit 18E determines in step S210 by determining whether or not a predetermined display adjustment condition is satisfied. The display adjustment condition is, for example, when new information is registered in the management information 20A, when at least a part of the information in the management information 20A is updated, when a predetermined timing is reached, or when a predetermined button or button image is instructed by an operation instruction of the input unit 14 by the user.

If a negative decision is made in step S210 (step S210: No), the process proceeds to step S216 described later. If a positive determination is made in step S210 (step S210: Yes), the process proceeds to step S212 described later.

In step S212, the determination unit 18E determines the display position on the relation display screen 50 of each of the plurality of text box images 52 included in the relation display screen 50 (step S212). The determination unit 18E also determines the document display information of the document 30 on the text display screen 60. As described above, for example, the determination unit 18E determines the display position of the text box image 52 so that at least one of the following conditions 1 to 6 is satisfied.

Then, the determination unit 18E updates the display management information of the management information 20A (step S214). That is, the determination unit 18E updates the management information 20A by registering the determined text box image information, relation setting information, and document display information in the management information 20A.

Next, the controller 18 determines whether to end the display process of the display screen 40 (step S216). The determination in step S216 is similar to that in step S110 (refer to FIG. 6). If a negative determination is made in step S216 (step S216: No), the process returns to step S200. On the other hand, if a positive determination is made in step S216 (step S216: Yes), this routine ends.

Note that the execution order of these processes of step S200 to step S204, step S206 to step S208, and step S210 to step S214 is not limited to the process order illustrated in FIG. 7.

As described above, the information processing apparatus 10 of the present embodiment includes the relation display controller 18B. The relation display controller 18B displays the relation display screen 50 including the text box image 52 indicating each of the plurality of text ranges 62 included in the document 30 and the relation image 54 indicating the relation between the plurality of text ranges 62.

As described above, the information processing apparatus 10 prepares the relation display screen 50 different from the text display screen 60 for displaying the document 30, and displays the text box image 52 corresponding to the text range 62 and the relation image 54 are displayed on the relation display screen 50.

Therefore, the information processing apparatus 10 of the present embodiment can display each of the plurality of related text ranges 62 in the display form in which the text box image 52 that does not depend on the positional relation of the text range 62 in the document 30. For example, even in a case where there is a relation between the plurality of text ranges 62 that are located apart from each other in the document 30, it is possible to display the relation display screen 50 in a form that allows easy recognition of the relation between these text ranges 62.

Therefore, the information processing apparatus 10 of the present embodiment can improve the visibility of the relation between the plurality of text ranges 62 included in the document 30.

Further, in the information processing apparatus 10 of the present embodiment, the determination unit 18E determines display position of each of the plurality of text box images 52 according to at least one of the display position of the text range 62 on the text display screen 60 and the relation setting information of the relation image 54.

Therefore, the information processing apparatus 10 of the present embodiment can automatically lay out the display position of the text box image 52 on the relation display screen 50. Therefore, the information processing apparatus 10 of the present embodiment can improve the work efficiency and the confirmation efficiency by the user in addition to the above effects.

Next, an example of a hardware configuration of the information processing apparatus 10 in the above embodiment will be described.

Figure 8:
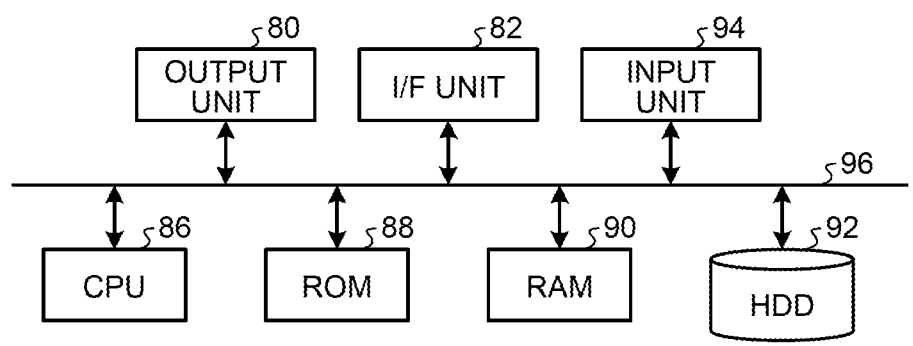
FIG. 8 is a hardware configuration diagram of an information processing apparatus of the embodiment.

FIG. 8 is an example of a hardware configuration diagram of the information processing apparatus 10 according to the above embodiment.

The information processing apparatus 10 includes a control device such as a CPU 86, a storage device such as a read only memory (ROM) 88, a random access memory (RAM) 90, a hard disk drive (HDD) 92, an I/F unit 82 that is an interface with various devices, an output unit 80 that outputs various types of information, an input unit 94 that receives user's operations, and a bus 96 that connects the units, and the hardware configuration uses a normal computer.

In the information processing apparatus 10, the CPU 86 reads the program from the ROM 88 onto the RAM 90 and executes the program, so that the above units are realized on the computer.

The program for executing each of the above processes executed by the information processing apparatus 10 may be stored in the HDD 92. Further, the program for executing each of the above processes executed by the information processing apparatus 10 may be provided by being incorporated in the ROM 88 in advance.

Further, the program for executing the above process executed by the information processing apparatus 10 may be provided as a computer program product stored in a computer-readable storage medium such as a CD-ROM, a CD-R, a memory card, a digital versatile disk (DVD), or a flexible disk (FD) in an installable or executable file. Further, the program for executing the above process executed by the information processing apparatus 10 may be stored in a computer connected to a network such as the Internet and may be provided by being downloaded via the network. Further, the program for executing the above process executed by the information processing apparatus 10 may be provided or distributed via a network such as the Internet.

While certain embodiments have been described, these embodiments have been presented by way of example only, and are not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. An information processing apparatus comprising:
one or more processors configured to
display a relation display screen including text box images each indicating one of a plurality of text ranges included in a document and a relation image indicating a relation between the plurality of text ranges;
set relation setting information that is information indicating the relation between the plurality of text ranges;
display the relation display screen including the text box images and the relation image indicating the relation indicated by the set relation setting information;
display a text display screen including the document;
determine a display position of each of the text box images on the relation display screen according to at least one of a display position of a text range on the text display screen and the relation setting information; and
identify a display position of a text range on the text display screen, and determine, in an area within a predetermined range from a corresponding display position on the relation display screen, a display position of a text box image indicating the text range.

2. The apparatus according to claim 1, wherein the relation image is a line image connecting the text box images.

3. The apparatus according to claim 2, wherein
the one or more processors display the relation display screen including the text box images, and the relation image representing a line image connecting the text box images having the relation indicated by the relation setting information in a display form according to the relation setting information.

4. The apparatus according to claim 1, wherein
the one or more processors display the text display screen indicated in a display form in which the plurality of text ranges are highlighted.

5. The apparatus according to claim 1, wherein
the one or more processors display the relation display screen upstream or downstream of the text display screen in a first direction that is a writing direction of a text of the document included in the text display screen.

6. The apparatus according to claim 1, wherein
the one or more processors identify a display position of the text range in a second direction on the text display screen, and determine, in an area within a predetermined range in the second direction from a corresponding display position on the relation display screen, a display position of the text box image indicating the text range.

7. The apparatus according to claim 1, wherein
the relation image includes relation images being arrow images each having a start point at one of two text box images and an end point at the other of the two text box images, and
the one or more processors determine a display position of each of the text box images on the relation display screen such that directions of arrows of the arrow images on the relation display screen are the same as each other.

8. The apparatus according to claim 1, wherein
the one or more processors determine a display position of each of the text box images on the relation display screen such that a distance between the text box images having the relation is shorter than a distance between text box images not having the relation.

9. The apparatus according to claim 1, wherein
the relation represents at least one of a causal relation, an identical relation, a correlate relation, an inclusion relation, and a time relation between the plurality of text ranges.

10. An information processing method executed by a computer, comprising:
displaying a relation display screen including text box images each indicating one of a plurality of text ranges included in a document and a relation image indicating a relation between the plurality of text ranges;
setting relation setting information that is information indicating the relation between the plurality of text ranges;

displaying the relation display screen including the text box images and the relation image indicating the relation indicated by the set relation setting information;

displaying a text display screen including the document;

determining a display position of each of the text box images on the relation display screen according to at least one of a display position of a text range on the text display screen and the relation setting information; and identifying a display position of a text range on the text display screen, and determining, in an area within a predetermined range from a corresponding display position on the relation display screen, a display position of a text box image indicating the text range.

11. An information processing system comprising:

a display; and one or more processors configured to:

display, on the display, a relation display screen including text box images each indicating one of a plurality of text ranges included in a document and a relation image indicating a relation between the plurality of text ranges;

set relation setting information that is information indicating the relation between the plurality of text ranges;

display the relation display screen including the text box images and the relation image indicating the relation indicated by the set relation setting information;

display a text display screen including the document;

determine a display position of each of the text box images on the relation display screen according to at least one of a display position of a text range on the text display screen and the relation setting information; and identify a display position of a text range on the text display screen, and determine, in an area within a predetermined range from a corresponding display position on the relation display screen, a display position of a text box image indicating the text range.

* * * * *